Jan. 5, 1960 P. ROSS 2,919,743
VEHICLE SEAT CONSTRUCTION
Filed Sept. 18, 1957 2 Sheets-Sheet 1

P. ROSS
INVENTOR.
BY
ATTORNEYS

P. ROSS
INVENTOR.

BY E.C. McRae
J.R. Faulkner
G.H. Oster

ATTORNEYS

United States Patent Office 2,919,743
Patented Jan. 5, 1960

2,919,743
VEHICLE SEAT CONSTRUCTION

Perry Ross, Oak Park, Mich., assignor to Ford Motor Company, Dearborn, Mich., a corporation of Delaware Application September 18, 1957, Serial No. 684,671

9 Claims. (Cl. 155—5)

This invention relates generally to a vehicle seat lock and more particularly to a seat lock for the seat back of a folding type seat.

Many of the vehicles on the road today use a single door on one side for providing access to both the front and rear compartments of the vehicle. Tudor passenger cars and station wagons and many trucks including the panel delivery type come within this category. The foldable front seats of these vehicles are generally unrestrained and will normally permit shock transference from the seat back to the occupant in the seat. If the seat is unoccupied, the seat back upon receiving a shock from the rear and/or as a result of quick deceleration will move forwardly allowing rear occupants or subjects to be thrown to the front of the vehicle. It is an object of this invention, therefore, to provide a locking mechanism for a foldable type seat which will prevent the transmission of shock loading by the seat back on the front seat occupants.

Another object is to provide a seat back lock for a folding type seat which will restrain rear seat occupants or weights from being thrown forwardly into the front occupant compartment.

Still another object is to provide a seat lock arrangement for the front seat back of a foldable type seat in which the lock is actuated automatically by closing the door adjacent to the seat and remains engaged until the same door is opened.

Still another object is to provide a seat lock actuatable by the adjacent door only when the seat back is in the upright position.

Still a further object is to provide a two-door front seat back lock of a type which will be usable in any of the fore or aft adjustable positions of the front seat.

Still another object is to provide a dependable lock for the seat back of a foldable type seat which is simple to manufacture, easy to assemble and low in cost.

Other objects and advantages of this invention will be made more apparent as this description proceeds, particularly when considered in connection with the accompanying drawings, wherein.

Figure 1:
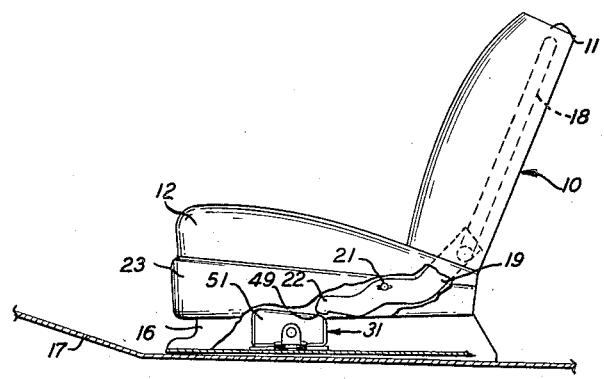
Figure 1 is a side elevational view partially in section of the front seat of the vehicle embodying the present invention.
Figure 2:
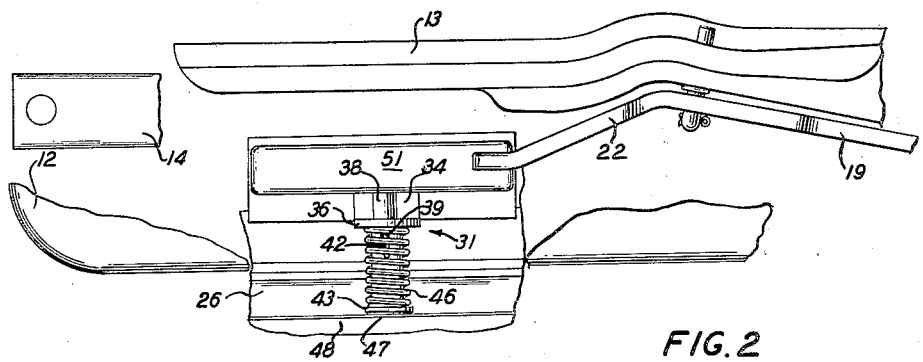
Figure 2 is an enlarged fragmentary plan elevational view partly in section of the structure shown in Figure 1 and showing the front seat lock engaged.
Figure 3:
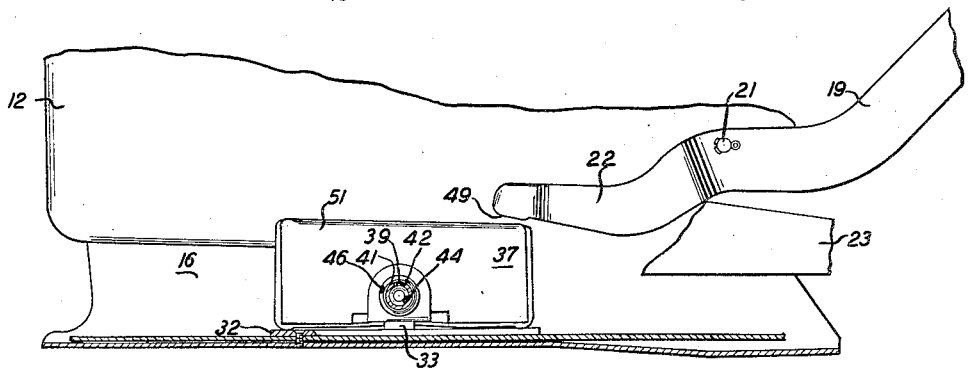
Figure 3 is an enlarged fragmentary side elevational view partly in section of the lock mechanism shown in Figure 1.

Because the locking mechanism is the same for both of the foldable seat backs making up the front seat, only one of the installations is shown and described.

Referring now to the drawings, a front seat 10 is shown of the foldable type having a seat back 11 foldable forwardly to provide access to the rear vehicle compartment (not shown). A seat cushion 12 is mounted on seat frame 13 which is slidably mounted in a conventional manner (not shown) to seat track 14 to provide the customary fore and aft seat adjustment. Seat track 14 is in turn supported on bracket 16 which is secured to the floorboard 17 of the vehicle.

The seat back 11 has a generally circumferentially extending frame 18 which provides the support for the seat back 11. A pair of arms 19 are weldably secured to the lower portion of the frame 18 and extends generally downwardly and forwardly along the outboard side of the seat where it is pivotally mounted at 21 to the seat frame 13 to provide one of the pivot axis for the folding seat back. The other axis for the seat back may be in the same plane to provide a forwardly folding structure and/or rearwardly thereof to provide a folding inward structure. Arm 19 is provided with a forward extension 22 which projects forwardly and downwardly of the pivot extension 21. Extension 22 is substantially hidden from view by shield 23 which also shields lower portion of cushion 12 as well as the arm 19.

Figure 4:
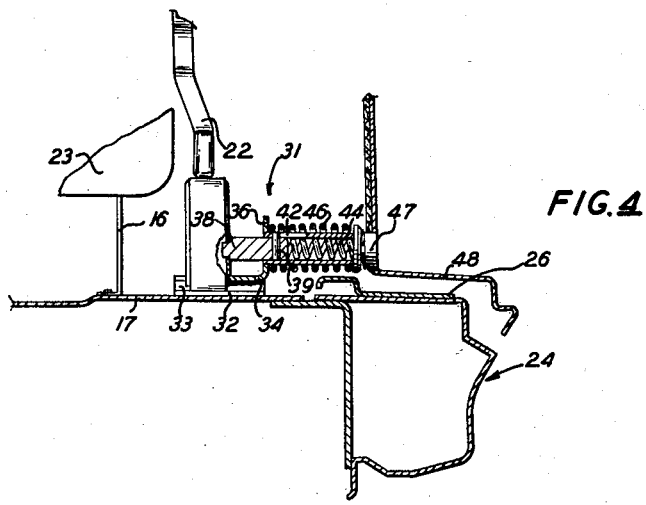
Figure 4 is an enlarged fragmentary front elevational view partly in section showing the front door closed and the lock mechanism engaged.
Figure 5:
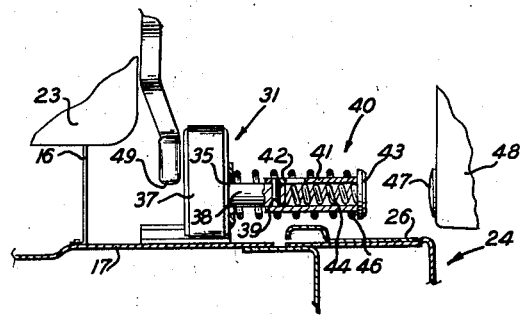
Figure 5 is a similar view to Figure 4 with the lock disengaged, the front seat back folded forwardly and the front door ajar; and, Figure 6 is a similar view to Figures 4 and 5 showing the front seat back folded, the lock disengaged and the front door closed.
Figure 6:
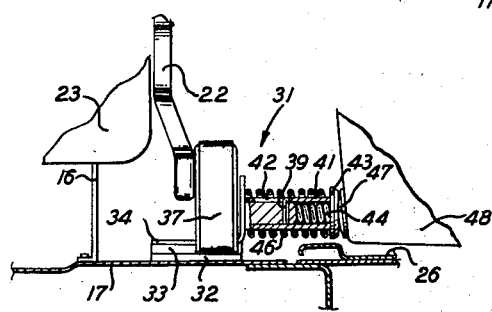

Referring now to Figures 4, 5 and 6, a rocker panel 24 is provided which extends longitudinally of the vehicle and has a scuff plate 26 secured to the top portion of the rocker panel. The lock arrangement is indicated generally at 31 and comprises a generally transversely extending reinforcement 32 secured to the floor pan 17 outboard of the seat bracket 16. A transversely extending guide plate 33 is secured atop of reinforcement 32 and serves as a support for L-shaped bracket 34 secured to the top of the plate 33. Bracket 34 has an upstanding flange 36 at its outboard side having an enlarged aperture 35 for a purpose to be later described.

Bracket 34 is wider than plate 33 and when both are secured to the reinforcement 32 provide a guide for the lateral movement of sliding block 37. The block 37 is cutaway at its lower portion and overlaps the bracket 34 and is movable only in a lateral direction. A transverse extension 38 is secured to the outboard side of the block 37 and projects through the enlarged aperture 35 in the upstanding flange 36. Extension 38 is apertured adjacent its free end to receive a guide pin 39 which has one end flush with the extension 38 and the other end extending outwardly therefrom a short distance. A plunger 40 is provided which has a sleeve 41 to slidably overlap the extension 38 and a button 43 secured to the sleeve 41 to engage a like button 47 mounted on the adjacent car door 48. Sleeve 41 is provided with a slot 42 having a curved entrant path open to one end of the sleeve for receiving the pin 49 and limits the movement of sleeve 41 with respect to the extension 38. An inner coil spring 44 is positioned between the extension 38 and the cap 43 and in its normally extended position maintains the sleeve 41 in the position shown in Figures 4 and 5. An outer coil spring 46 circumferentially surrounds the sleeve 41 and abuts against the upstanding flange 36 and the cap 43 urging sleeve 41 outwardly and maintaining pin 39 at the inner end of the slot 42. Spring 46 has a lower compression rate and load than spring 44 and normally will be compressed before compression of spring 44 commences. It is also to be noted that the aperture 35 is large enough to receive the end of sleeve 41 when the door is closed and plunger 40 moved laterally inboard as shown in Figure 4.

In the unlocked position such as shown in Figure 5, spring 46 is expanded, thus yieldably holding the block 37 against the face of the upstanding flange 36. When the block 37 is held against the flange 36, it is out of the vertical path of the arm 22, and the seat back 11 may then be folded forwardly allowing ingress or egress to or from the rear compartment. After the loading or unloading is completed, the seat back 11 is pushed rearward to its normal upright position and the door closed. This action of closing the door results in the contact of the respective buttons 43 and 47 and the compression of outer spring 46, and the resultant movement of the block 37 inboard so that the tip 49 of the extension 22 is positioned in the same vertical plane and slightly above the inclined surface 51 of the block 37. Surface 51 corresponds to the angle of travel of the seat in its fore and aft movement thereby positively preventing the seat back from folding regardless of the adjusted seat position.

A safety feature is provided in event the door 48 is closed when the seat back 11 is forwardly inclined, as shown in Figures 5 and 6. In the initial movement, outer spring 46 is compressed and block 37 moved laterally inboard until it strikes the side of extension 22. Further closing movement of the door 48 results in the compression of the inner spring 44 permitting the sleeve 41 to move inboard over the extension 38 thus pin 39 is now at the outboard end of the slot 41. It can thus be seen that the door may be effectively closed with the seat back in the inclined position. Because the connection is of a yieldable nature by virtue of the two springs, the seat back may, at any time, be moved rearwardly to its normal upright position allowing the spring 44 to expand to its normal position and snapping the block 37 in its locking position directly beneath the tip 49 of the extension 22.

It will be understood that the invention is not to be limited to the exact construction shown and described and that various changes and modifications may be made including, but not limited, to substantially concealing the locking mechanism under a flared-out shield 23, repositioning the locking mechanism beneath the floorboard and having the plunger and cap extended through the rocker panel and the use of a ball and detent construction in place of the outer spring, slot and pin construction without departing from the spirit and scope of the invention, as defined in the appended claims.

What is claimed is:

1. A seat back lock for a motor vehicle having a door, a floor pan, a seat adjacent to said door, and means mounting said seat on said floor pan for longitudinal movement thereof, said seat having a frame, a seat back, and a rigid arm secured to said seat back and pivotally mounted to the frame, said mounting being inwardly of the rigid arm and defining a forward extension on the arm beyond the mounting, a bracket mounted to said floor pan, a plunger slidably mounted in said bracket for transverse movement with respect to said vehicle, a block secured to said plunger and movable laterally with said plunger, said plunger and said block being positionable in one of two positions, one of said positions being an inward blocking position of the extension and the other position being an outward unblocked position of the extension, means on said door engageable with said plunger and spring means between said plunger and said bracket urging said plunger and block respectively to the outboard unblocked position of the extension whereupon the closing of said door compresses the spring means and moves the plunger and block respectively inwardly to the blocked position of the extension when the seat back is in the upright position.

2. A seat back locking mechansm for a motor vehicle having a door, a floor pan, a seat, and means mounting said seat on said floor pan for movement fore and aft, said seat being adjacent to said door and having a transverse frame and a seat back, an arm connected to said seat back and pivotally mounted to said frame, said arm having a generally forwardly projecting extension beyond the pivot mounting, a blocking member, means mounting the blocking member on said floor pan for movement to one of two positions, one position being in a blocked position of the extension and the second position being in an unblocked position of the extension, a lost motion connection in said blocking member, means on said door engageable with said blocking member whereupon the closing of said door moves said blocking member to the unblocked position when the seat back is in the upright position, spring means urging said blocking member to the unblocked position on the opening of said door, said lost motion connection permitting a predetermined amount of shortening in the blocking member only when the seat back is in the folded position and the door closed.

3. The structure defined by claim 2, which is further characterized in that the mounting of said blocking member to the floor pan comprises a bracket rigidly mounted to the floor pan, said bracket having an upstanding apertured end, and said blocking member comprises a plunger extending transversely of the vehicle and through said apertured end, and a block secured to said plunger, said block being positioned on the side of the apertured end adjacent to the seat.

4. The structure defined by claim 2, which is further characterized in that the mounting of said blocking member to the floor pan comprises an L-shaped bracket rigidly mounted to the floor pan and defining a guide, said bracket having an apertured end extending vertically from the floor board, and said blocking member comprises a transverse rod extending through said apertured end, a plunger coaxialy mounted for limited axial movement to said rod at the end of the rod adjacent to the door and engageable with the means on the door, a mounting block secured to the end of the rod adjacent to the extension and movable in the guide, said lost motion connection being disposed between said rod and said plunger.

5. A seat back locking mechanism for a motor vehicle having a door, a floor structure, a seat, and means mounting said seat on said floor structure for movement fore and aft, said seat being adjacent to said door and having a transverse frame, a seat back, an arm connected to said seat back and pivotally mounted to said frame, said arm having a generally forwardly projecting extension beyond the pivot mounting, a bracket secured to the floor structure between the seat and the door, said bracket having a vertically extending apertured end, a connector mounted transversely of the seat and extending through said apertured end, a pin extending through the end of the connector adjacent to the door, a sleeve-like plunger coaxially engaging said connector on the end adjacent to the door, said sleeve having a predetermined length axially extending groove and said pin in said connector being positioned within said groove and limiting the plunger movement on said connector the extent of the groove, yieldable means positioned within said plunger and normally maintaining the sleeve and the connector in the outermost position permitted by the pin in the groove, a spacer mounted to the end of the connector opposite to the plunger, means on said door engageable with said plunger whereupon the closing of said door moves said plunger, connector and spacer inwardly and positions the spacer to block the extension when the seat back is in the upright position, spring means urging said plunger, connector and spacer outwardly and moving the spacer from blocking the extension when the door is open, said yieldable means compressing and allowing the plunger to move axially of the rod to the innermost position of the plunger on the connector when the seat back is folded forwardly and the door closed.

6. The structure defined by claim 5 which is further characterized in that said yieldable means comprises a spring bottoming against the plunger and connector respectively, and said spring means comprises a spring bottoming against the vertically extending apertured end and the plunger respectively, said last named spring having a compression rate and load in excess of the first named spring, said first named spring being compressible first before the second name spring.

7. The structure defined by claim 5 which is further characterized in that said spacer is provided with an angled surface, said surface paralleling the line of travel of said seat in any one of the selected positions between full fore and aft.

8. A seat locking mechanism for a motor vehicle body having a door, a floor structure, a seat mounted to the floor structure adjacent to said door, said seat having a frame and a seat back, an arm rigidly connected to the seat back and pivotally mounted to said seat frame, said arm having an extension projecting forwardly of the pivot mounting when the seat back is in the unfolded position, a blocking member, means mounting said blocking member on the floor structure for movement to one of two positions, one position being an inboard blocking position and the other position being an outboard unblocked position, said mounting means comprising a guide plate secured to said floor structure and a bracket having a generally upstanding end secured to the guide plate, said bracket and guide plate defining a guide for the movable blocking member, said upstanding end defining the outboard unblocked position of the blocking member, means on said door engageable with said blocking member whereupon the closing of said door moves said blocking member inboard to the blocked position of the extension when the seat back is in the unfolded position and prevents the forward folding thereof, and means biasing said blocking member to the outboard unblocked position upon the opening of the door.

9. A seat locking mechanism for a motor vehicle body having a door, a floor structure, a seat mounted to the floor structure adjacent to said door, said seat having a frame and a seat back, an arm rigidly connected to the seat back and pivotally mounted to said seat frame, said arm having an extension projecting forwardly of the pivot mounting when the seat back is in the unfolded position, a blocking member, means mounting said blocking member on said floor structure for movement to one of two positions, one position being an inboard blocking position and the other position being an outboard unblocked position, said blocking member mounting means comprising an L-shaped bracket rigidly secured to said floor structure, said bracket having an upstanding apertured end, a rod slidably mounted in said apertured end, a plunger mounted on said rod on the side of the upstanding end adjacent to the door, a mounting block secured to the rod on the side of the upstanding end adjacent to the extension, and spring means comprising a coiled spring wound about the plunger and interposed between the upstanding end and said plunger, and means on said door engageable with said blocking member whereupon the closing of said door moves said blocking member inboard to the blocked position of the extension when the seat back is in the unfolded position and prevents the forward folding thereof, said spring means biasing said blocking member to the outboard unblocked position upon the opening of the door.

References Cited in the file of this patent

UNITED STATES PATENTS

| | | |
|---|---|---|
| 2,624,613 | Parmely | Jan. 6, 1953 |
| 2,737,229 | Semar | Mar. 6, 1956 |
| 2,760,813 | Colm | Aug. 28, 1956 |
| 2,783,821 | Sherman | Mar. 5, 1957 |
| 2,815,796 | Lobanoff | Dec. 10, 1957 |